(12) United States Patent
Drechsler et al.

(10) Patent No.: US 6,268,410 B1
(45) Date of Patent: *Jul. 31, 2001

(54) COLORED CONCRETE ROOFING TILES AND A METHOD FOR PRODUCING COLORED CONCRETE BODIES SUCH AS COLORED CONCRETE ROOFING TILES

(75) Inventors: Andreas Drechsler, Seligenstadt; Daniel Neupert, Alzenau; Silke Werner, Heusenstamm, all of (DE)

(73) Assignee: Laferge Braas GmbH, Oberursel (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/503,672

(22) Filed: Feb. 14, 2000

Related U.S. Application Data

(63) Continuation of application No. 09/036,463, filed on Mar. 6, 1998, which is a continuation-in-part of application No. PCT/EP96/03875, filed on Sep. 4, 1996.

(30) Foreign Application Priority Data

Sep. 7, 1995 (DE) ............................... 195 33 081

(51) Int. Cl.⁷ .................................... C08K 3/00
(52) U.S. Cl. .................................... 524/5; 524/8
(58) Field of Search ............................. 524/5, 8

(56) References Cited

U.S. PATENT DOCUMENTS

| 4,548,968 | 10/1985 | Jaffe . |
| 4,695,418 | 9/1987 | Baker et al. . |
| 5,173,233 | 12/1992 | Kafarowski . |
| 5,223,200 | 6/1993 | Schulz et al. . |
| 5,385,971 | 1/1995 | Sauer et al. . |
| 5,401,313 | 3/1995 | Supplee et al. . |
| 5,584,921 | 12/1996 | Wagner et al. . |
| 5,595,698 | 1/1997 | Nicholas et al. . |
| 6,090,329 | * 7/2000 | Drechsler et al. ........... 264/373 |

FOREIGN PATENT DOCUMENTS

| 2223329 | 10/1974 | (FR) . |
| 1466321 | 3/1977 | (GB) . |
| 1301551 | 12/1989 | (JP) . |
| 2124753 | 5/1990 | (JP) . |
| 6057148 | 3/1994 | (JP) . |
| 8105814 | 12/1981 | (NL) . |
| 9418137 | 8/1994 | (WO) . |

OTHER PUBLICATIONS

"Vorschläge zur Verbesserung farbiger Betonwaren" "Suggestions for Improving Coloured Concrete Products", Adolf M. Veit, Walluf, Concrete Precasting Plant and Technology, Issue Nov. 1994, pp. 92–100.

* cited by examiner

Primary Examiner—Edward J. Cain
(74) Attorney, Agent, or Firm—Nils H. Ljungman & Associates

(57) ABSTRACT

A method for producing colored concrete bodies, particularly colored concrete roof tiles, whereby pigment is added to the unprocessed concrete mix. In order to provide the production of permanently colored concrete bodies with reasonably priced pigments which are stable in outdoor exposure and are resistant to light, particularly UV, alkaiis and heat. A cement compatible aqueous polymer dispersion in which organic pigment is dispersed is added to the unprocessed concrete mix. Suitable cement compatible polymer dispersions are aqueous polymer dispersions based on styrene and/or pure acrylate. Phthalocyanine and quinacridone pigments are particularly suitable as organic pigments.

20 Claims, 1 Drawing Sheet

COLORED CONCRETE ROOFING TILES AND A METHOD FOR PRODUCING COLORED CONCRETE BODIES SUCH AS COLORED CONCRETE ROOFING TILES

This is a continuation, of U.S. Ser. No. 09/036,463, filed on Mar. 6, 1998, which is a continuation-in-part of International Patent Application No. PCT/EP96/03875, filed on Sep. 4, 1996, and priority from Federal Republic of Germany Patent Application No. 195 33 081.1, filed on Sep. 7, 1995.

BACKGROUND OF THE INVENTION

1. Field of the Invention

The present invention relates to a method for producing colored concrete bodies, particularly colored concrete roof tiles, whereby pigment is added to the unprocessed concrete mix.

2. Background Information

Colored concrete bodies are used, for example, as roof tiles, pavers, slabs, etc. Normally, such concrete bodies are colored with inorganic, preferably mineral, pigments. Iron oxides, but also chromium oxides or spinel compounds such as cobalt aluminium oxide, are used. These types of pigments have been well established for many years and have proved to be durable. However, relatively expensive inorganic pigments are needed, in particular for the production of blue shades. Moreover, the color intensity of these pigments is relatively low.

OBJECT OF THE INVENTION

The object of the present invention is to provide a method to produce permanently colored concrete bodies with reasonably priced pigments which are stable in outdoor exposure and resistant to light, particularly UV (ultra-violet light), alkalis and heat.

SUMMARY OF THE INVENTION

The present invention accomplishes this object in that a cement compatible aqueous polymer dispersion, in which organic pigment is dispersed, is added to the unprocessed concrete mix.

The unprocessed concrete mix can then be shaped into bodies and cured in any of the usual known ways.

Organic pigments were hitherto considered unsuitable for coloring concrete bodies, as is stated by A. M. Veit in his article "Suggestions for Improving Coloured Concrete Products" in the periodical "Betonwerk+Fertigteil-Technik", volume 11/1994, pp 92–100. Organic pigments cannot be properly bound into the hydraulically hardening matrix.

Consequently, these pigments are gradually eluted, and the concrete body fades with time, inevitably giving rise to complaints.

However, because of their binding into a cement compatible polymer dispersion, the method of the present invention makes it possible to incorporate organic pigments permanently in the matrix of the concrete body, so that elutriation does not occur. What is crucial for the success of the method as per the present invention is that a dispersion is produced which contains at least dispersed organic polymer and coloring. If the coloring is dispersed as pigment in an aqueous polymer dispersion, polymer particles can be deposited on the surface of the pigment particles and ultimately surround the latter. Hence the pigment particles are surrounded and protected by polymer particles. When the dispersion desiccates, the pigment particles are bound into the plastic matrix. This also applies to chemically bound pigment. In the case of aqueous dispersions, the dispersion is non-redispersible and of high molecular weight. In other words, following desiccation of the original dispersion, a plastic results which cannot be converted back into a dispersion with the addition of more water. Hence the purpose of the present invention is achieved, i.e. the production of permanently colored concrete bodies.

Some organic pigments have a coloring power up to about 20 times that of the same color inorganic pigments. In other words, a much smaller amount of organic pigment is needed to produce the same intensity of color.

In addition, a much greater color intensity of the concrete body can be achieved at a far lower cost than with mineral pigments.

Furthermore, shades can be achieved which are not possible with mineral pigments. As a suitable cement compatible polymer dispersion, preference is given to an aqueous polymer dispersion whose polymer contains styrene and/or pure acrylate. However, any polymer dispersion which is of high molecular weight, stable in cement and non-redispersible is suitable. The molar mass of the typical high molecular weight polymer is about 10 grams/Mol.

It is advantageous for the polymer dispersion to contain about 5–30% by weight of the organic pigment.

In order to increase the color intensity, a wetting and/or dispersing agent can be added to the preparation; also possible are admixtures to prevent the pigment from precipitating.

It is advantageous for the polymer dispersion to be added to the unprocessed concrete mix in such a quantity that the pigment/cement ratio is between about 0.002 and 0.05.

A light-fast substance such as phthalocyanine or quinacridone pigment is particularly suitable as organic pigment. Phthalocyanine pigment in particular can be produced in various colors, from blue copper phthalocyanine to green hexadecachlorophthalocyanine.

The pigment preparation can of course also contain a blend of various organic pigments, and mineral pigment can be added if required. In the method as per the present invention, it is also possible to permanently bind pigment such as carbon black into concrete.

The organic coloring molecules can contain substituents which, for example, make possible a copolymerization with the dispersion polymer, so that the organic pigment is bound chemically in the polymer chain.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWING

The present invention is explained in greater detail below with reference to the accompanying figure, wherein.

DESCRIPTION OF THE PREFERRED EMBODIMENTS

Figure 1:
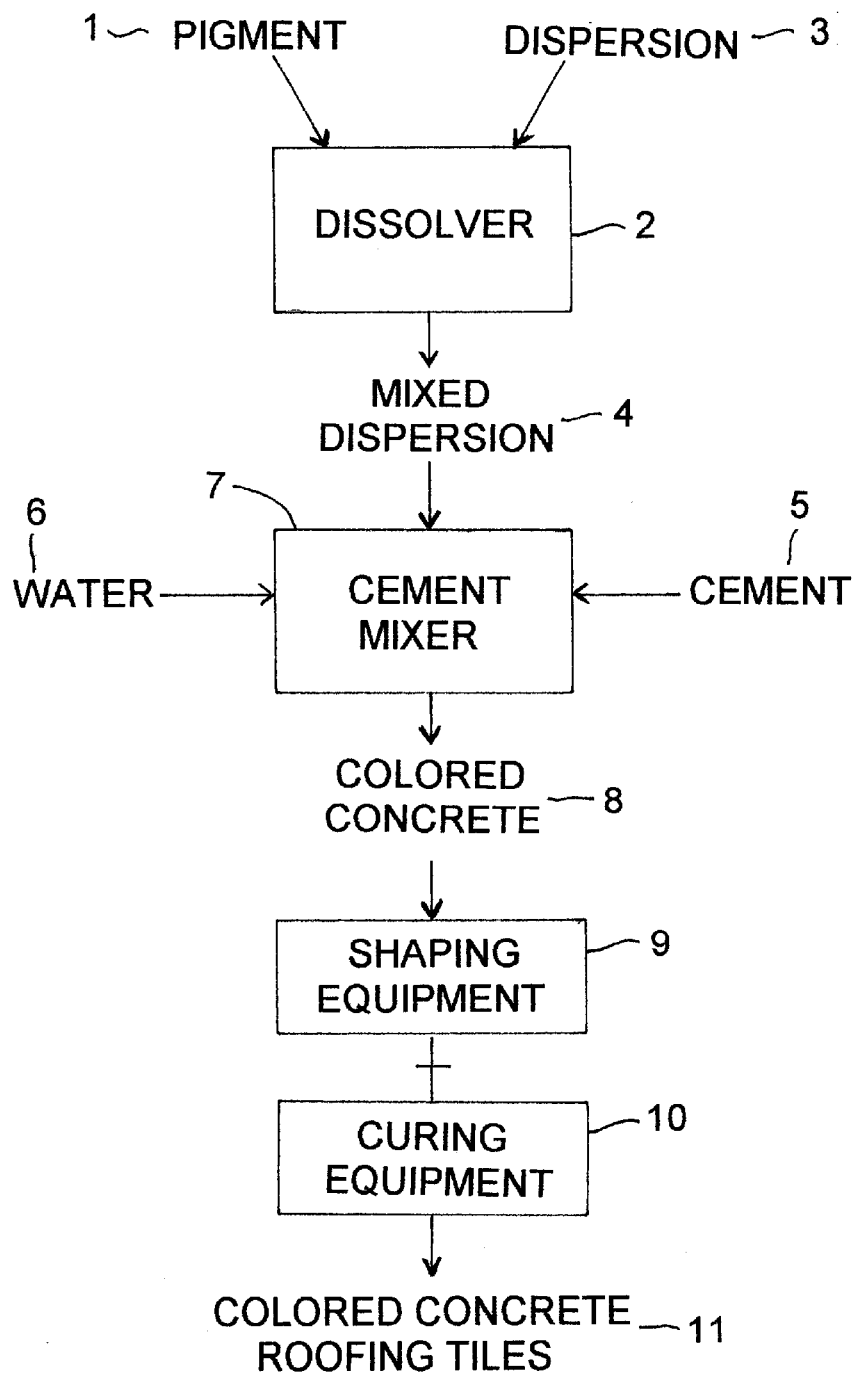
FIG. 1 is a flow chart showing one possible embodiment of the present invention.

The method of the present invention is explained below using four possible embodiments.

Embodiment 1:

50 g of copper phthalocyanine was dispersed in a dissolver for 15 minutes with 950 grams of a styrene acrylate dispersion (LDM 6880, 50% proportion, Hoechst). 16.8 grams of this preparation was added to an unprocessed concrete mix of 1350 grams of sand with a grain size of 0 to 3 mm, 420 grams of cement CEM I 42.5 R and 135 grams of water. The colored concrete mix was shaped into a body. Following curing of the shaped body, a light blue concrete body was obtained.

Embodiment 2:

300 grams of copper phthalocyanine was dispersed in a dissolver for 15 minutes with 700 grams of a pure acrylate dispersion (B60A, 50% proportion, Rohm & Haas). 70 grams of this preparation was added to an unprocessed concrete mix of 1350 grams of sand with a grain size of 0 to 3 mm, 420 grams of cement CEM I 42.5 R and 120 grams of water. Concrete bodies made from this mix had an intense blue color.

Embodiment 3:

100 grams of quinacridone pigment was dispersed in a dissolver for 15 minutes with 600 grams of a styrene acrylate dispersion (LDM 6880, 50% proportion, Hoechst). 43 grams of this preparation was added to an unprocessed concrete mix of 1350 grams of sand with a grain size of 0 to 3 mm, 420 grams of cement CEM I 42.5 R and 109 grams of water. After shaping and curing, a light violet concrete body was obtained.

Embodiment 4:

150 grams of quinacridone pigment was dispersed in a dissolver for 15 minutes with 300 grams of a styrene acrylate dispersion (LDM 6880, 50% proportion, Hoechst). 63.3 grams of this preparation was added to an unprocessed concrete mix of 1350 grams of sand with a grain size of 0 to 3 mm, 420 grams of cement CEM I 42.5 R and 109 grams of water. After shaping and curing, an intense violet concrete body was obtained.

One possible technique for producing the permanently, or essentially permanently, colored cement roofing tiles in accordance with the present invention is to use standard well-known methods and/or apparatus for preparing concrete. As shown in FIG. 1, these well-known methods and/or apparatus could include or be used in conjunction with steps including: dispersing a pigment 1 with a dispersion 3 in a dissolver vessel 2 to form a second or mixed dispersion 4; adding said mixed dispersion 4 with unprocessed concrete mix 5 and water 6 in a cement mixer 7 to produce colored concrete 8; shaping said colored concrete 8 into roofing tiles with shaping equipment 9 and curing said colored concrete with curing equipment 10, to produce colored concrete roofing tiles 11.

One feature of the invention resides broadly in the method for producing colored concrete bodies, particularly colored roof tiles, whereby pigment is added to the unprocessed concrete mix, characterized in that a cement compatible aqueous polymer dispersion is added in which an organic pigment is dispersed.

Another feature of the invention resides broadly in the method characterized in that the polymer of the polymer dispersion contains styrene and/or pure acrylate.

Yet another feature of the invention resides broadly in the method characterized in that the polymer dispersion contains 5–30% by weight of the organic pigment.

Still another feature of the invention resides broadly in the method characterized in that the polymer dispersion contains a wetting and/or dispersing agent.

A further feature of the invention resides broadly in the method characterized in that the ratio of the pigment to cement in the unprocessed concrete mix is between 0.002 and 0.05.

Another feature of the invention resides broadly in the method characterized in that the organic pigment is a phthalocyanine pigment.

Yet another feature of the invention resides broadly in the method characterized in that the organic pigment is a quinacridone pigment.

Still another feature of the invention resides broadly in the method characterized in that the organic pigment is chemically bound in the polymer chain.

In at least one possible embodiment of the present invention some of the compounds, chemicals or dispersions used, including, the cement CEM I 42.5 R, the pure acrylate dispersion (B60A, 50% proportion, Rohm & Haas), and/or the styrene acrylate dispersion (LDM 6880, 50% proportion, Hoechst) can be in accordance to Deutsche Industrie Normal (DIN) standards.

The references herein to "Hoechst" and "Rohm & Haas" refer to companies which are well-known in the chemical community. The reference to "Hoechst" includes Hoechst Aktiengesellschaft in Germany, as well as its subsidiaries and related companies around the world, and the reference to "Rohm and Haas" includes the Rohm & Haas Company in the U.S. (e.g., Philadelphia, Pa.) and Rohm & Hass Deutschland GmbH in Frankfurt, Germany as well as their subsidiaries and related companies around the world.

To further explain, in at least one possible embodiment of the present invention, in regard to the use of the term "dissolver" in the present application, the term "dissolver" could possibly refer to a high-speed agitator disc unit which has been in use for decades in the paint industry to describe dispersing devices for the dispersion of easily dispersible pigments.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 195 33 081.1, filed on Sep. 7, 1995, having inventors Andreas Drechsler, Daniel Neupert, and Silke Werner, and DE-OS 195 33 081.1 and DE-PS 195 33 081.1 and International Application No. PCT/EP96/03875, filed on Sep. 4, 1996, and published as WO 97/09284 on Mar. 13, 1997, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

Examples of organic pigments and/or polymer dispersions and methods or apparatus using same, which might be used in conjunction with at least one embodiment of the present invention may be found in U.S. Pat. No. 5,380,614, issued to H. Totsuka and H. Takeuchi on Jan. 10, 1995; U.S. Pat. No. 5,401,780, issued to P. Bugnon and F. Herren on Mar. 28, 1995; U.S. Pat. No. 5,457,203, issued to S. Hendi and E. Jaffe on Oct. 10, 1995; U.S. Pat. No. 5,472,496, issued to S. Hendi et al. on Dec. 5, 1995; U.S. Pat. No. 5,229,438, issued to Y. Ishida et al. on Jul. 20, 1993; U.S. Pat. No. 5,520,725, issued to S. Kato et al. on May 28, 1996; U.S. Pat. No. 5,703,156, issued to T. Sauer on Dec. 30, 1997; U.S. Pat. No. 3,615,303, issued to H. Singer et al. on Oct. 26, 1971; U.S. Pat. No. 5,378,404, issued to C. Han and L Shacklette on Jan. 3, 1995; U.S. Pat. No. 5,380,496, issued on Jan. 10, 1995 to Y. Hashiguchi et al.; U.S. Pat. No. 5,385,971 issued to T. Sauer and B. Stutzel on Jan. 31, 1995; U.S. Pat. No. 5,380,771 issued to J. Nothnagel on Jan. 10, 1995; U.S. Pat. No. 5,403,883, issued to B. Messner et al. on Apr. 4, 1995; U.S. Pat. No. 5,405,879 issued to M. Uemae and T. Komatsu on Apr. 11, 1995; U.S. Pat. No. 5,412,023 issued to H. Hille and M. Massone on May 2, 1995; and U.S. Pat. No. 5,426,146 issued to O. Aydin et al. on Jun. 20, 1995.

Examples of dissolvers which may possibly be used with at least one embodiment of the present invention may be found in U.S. Pat. No. 5,414,022, issued to W. Toot and B. Debruin on May 9, 1995; U.S. Pat. No. 5,216,039, issued to L. Lauri on Jun. 1, 1993; U.S. Pat. No. 5,364,603 issued to J. Christian and P. Anderson on Nov. 15, 1994; and U.S. Pat. No. 4,917,773 issued to P. Brun and J. Guerin on Apr. 17, 1990. Additional information on dissolvers may be found in: Dyckerhoff customer information; Hoechst High Chem/Safety Data Sheet; PENDRAULIK brochure—Extract from the "Handbuch der Anstrich- und Beschichtungstechnik" [Handbook of Paints and Coatings Technology], Bayer AG Extracts 3.1.1.2, taken from 450 31-P.

Examples of methods and/or apparatus for the use or preparation of concrete which may possibly be used with at least one embodiment of the present invention may be found in U.S. patent application Ser. No. 08/996,827 filed on Dec. 23, 1997 having inventor K. Hofmann; and Ser. No. 09/002,455 filed on Jan. 2, 1998 having inventors H. Rapp, et al.; and U.S. Pat. No. 5,707,179, issued to M. Bruckelmyer on Jan. 13, 1998; U.S. Pat. No. 4,240,952, issued to C. Hulbert et al. on Dec. 23, 1980; U.S. Pat. No. 4,340,553, issued to N. Fosse on Jul. 20, 1982; U.S. Pat. No. 5,223,200, issued to H. Schulz et al. on Jun. 29, 1993; U.S. Pat. No. 4,695,418, issued to Baker et al. in September 1987; U.S. Pat. No. 4,231,801, issued to H. Dunton on Nov. 4, 1980; U.S. Pat. No. 3,663,251 issued to R. Moren et ano. May 16, 1972; U.S. Pat. No. 5,328,508, issued to T. Lin on Jul. 12, 1994; U.S. Pat. No. 4,187,118, issued to K. Nakagawa and Y. Watanabe on Feb. 5, 1980; and U.S. Pat. No. 5,593,493 issued to D. Krofchak on Jan. 14, 1997.

Other publications and patents containing information, apparatus and/or methods or part thereof, relating to colored concrete products, may be found in: Japanese Patent No. JP920214374, dated Aug. 11, 1992; French Patent No. 2.223.329 issued on Oct. 25, 1974; Great Britian Patent No. 1,466,321, dated Mar. 9, 1977; WO-A-9418137 dated Aug. 18, 1994; U.S. Pat. No. 5, 401,313, issued Mar. 28, 1995; U.S. Pat. No. 4,548,968, issued on Oct. 22, 1985; U.S. Pat. No. 4,478,968, issued on Oct. 23, 1984; and Netherlands Patent No. 8,105,814 dated Jul. 18, 1983.

The invention as described hereinabove in the context of the preferred embodiments is not to be taken as limited to all of the provided details thereof, since modifications and variations thereof may be made without departing from the spirit and scope of the invention.

What is claimed is:

1. An outdoor exposure resistant colored concrete roofing tile comprising:

cement and sand with organic pigment particles and sufficient cement compatible polymer to sufficiently surround the organic pigment particles with the cement compatible aqueous polymer dispersion to an form outdoor exposure resistant colored roofing tile.

2. The outdoor exposure resistant colored concrete roofing tile according to claim 1 wherein sufficient cement compatible aqueous polymer comprises a plastic matrix binding the organic pigment particles.

3. The outdoor exposure resistant colored concrete roofing tile according to claim 2, wherein:

the organic pigment particles are selected from the group consisting of at least one of: a phthalocyanine pigment and a quinacridone pigment.

4. The outdoor exposure resistant colored concrete roofing tile according to claim 3, wherein the cement compatible aqueous polymer selected from the group consisting of at least one of: styrene and pure acrylate.

5. The outdoor exposure resistant colored concrete roofing tile according to claim 4, wherein:

the organic pigment particles are about 5–30% by weight of the cement compatible aqueous polymer; and a ratio of the organic pigment particles in the concrete is between about 0.002 to 1 and 0.05 to 1.

6. The outdoor exposure resistant colored concrete roofing tile according to claim 5 including a mineral pigment.

7. The outdoor exposure resistant colored concrete roofing tile according to claim 5 wherein said organic pigment particles are copolymerized with said cement compatible polymer and form a polymer chain.

8. An outdoor exposure resistant colored concrete body comprising of:

cement and sand with organic pigment particles and sufficient cement compatible polymer to sufficiently coat the organic pigment particles with the cement compatible aqueous polymer dispersion to an form outdoor exposure resistant colored concrete body.

9. The outdoor exposure resistant colored concrete body according to claim 8 wherein sufficient cement compatible aqueous polymer comprises a plastic matrix binding the organic pigment particles.

10. The outdoor exposure resistant colored concrete body according to claim 9, wherein the cement compatible aqueous polymer selected from the group consisting of at least one of: styrene and pure acrylate.

11. The outdoor exposure resistant colored concrete body according to claim 10, wherein:
the organic pigment particles are about 5–30% by weight of the cement compatible aqueous polymer; and
a ratio of the organic pigment particles in the concrete is between about 0.002 to 1 and 0.05 to 1.

12. The outdoor exposure resistant colored concrete body according to claim 11 wherein:
the cement compatible aqueous polymer dispersion is selected from the group consisting of at least one of: a wetting agent and a dispersing agent; and
the organic pigment particles are selected from a group consisting of at least one of: a phthalocyanine pigment and a quinacridone pigment.

13. The outdoor exposure resistant colored concrete body according to claim 12 wherein said organic pigment particles are copolymerized with said cement compatible polymer and form a polymer chain.

14. An outdoor exposure resistant colored concrete body comprising:
cement and sand with organic pigment particles and sufficient cement compatible polymer;
said cement compatible polymer deposited on the surface of the pigment particles to sufficiently surround and protect the organic pigment particles with the cement compatible aqueous polymer dispersion to form outdoor exposure resistant colored concrete body.

15. The outdoor exposure resistant colored concrete body according to claim 14 wherein sufficient cement compatible aqueous polymer comprises a plastic matrix binding the organic pigment particles and wherein said plastic matrix is stable and non-convertible into a dispersion upon addition of water to the body.

16. The outdoor exposure resistant colored concrete body according to claim 15, wherein:
the organic pigment particles are selected from the group consisting of at least one of: a phthalocyanine pigment and a quinacridone pigment.

17. The outdoor exposure resistant colored concrete body according to claim 16, wherein the cement compatible aqueous polymer selected from the group consisting of at least one of: styrene and pure acrylate.

18. The outdoor exposure resistant colored concrete body according to claim 17, wherein:
the organic pigment particles are about 5–30% by weight of the cement compatible aqueous polymer; and
a ratio of the organic pigment particles in the concrete is between about 0.002 to 1 and 0.05 to 1.

19. The outdoor exposure resistant colored concrete body according to claim 18 including a mineral pigment.

20. The outdoor exposure resistant colored concrete body according to claim 19 wherein said organic pigment particles are copolymerized with said cement compatible polymer and form a polymer chain.

* * * * *

UNITED STATES PATENT AND TRADEMARK OFFICE
CERTIFICATE OF CORRECTION

| | |
|---|---|
| PATENT NO. | : 6,268,410 B1 |
| DATED | : July 31, 2001 |
| INVENTOR(S) | : Andreas Drechsler, Daniel Neupert and Silke Werner |

It is certified that error appears in the above-identified patent and that said Letters Patent is hereby corrected as shown below:

Title page,
Item [73], delete "Laferge" and substitute -- Lafarge --.

Column 2,
Line 25, after 'about' delete "10" and substitute -- $10^6$ --.

Signed and Sealed this

Thirtieth Day of April, 2002

Attest:

JAMES E. ROGAN
*Director of the United States Patent and Trademark Office*

*Attesting Officer*